United States Patent [19]

Davidson

[11] 4,008,314
[45] Feb. 15, 1977

[54] MANUFACTURE OF SOLID AMMONIUM PHOSPHATE

[75] Inventor: Eric Davidson, Edinburgh, Scotland

[73] Assignee: Scottish Agricultural Industries Limited, Edinburgh, Scotland

[22] Filed: Jan. 20, 1976

[21] Appl. No.: 650,755

[30] Foreign Application Priority Data

Jan. 30, 1975 United Kingdom ............ 4095/75

[52] U.S. Cl. .................. 423/309; 423/313; 71/34; 71/41; 71/43

[51] Int. Cl.² ........................ C01B 25/28

[58] Field of Search ......... 71/34, 41, 43; 423/309, 423/310, 312, 313

[56] References Cited

UNITED STATES PATENTS

| | | | |
|---|---|---|---|
| 3,019,099 | 1/1962 | Walters, Jr. ................ | 71/41 X |
| 3,226,184 | 12/1965 | Brownlie et al. ............ | 423/310 |

FOREIGN PATENTS OR APPLICATIONS 631,456  11/1961  Canada ............................. 71/41

Primary Examiner—Frank A. Spear, Jr.
Assistant Examiner—Ferris H. Lander
Attorney, Agent, or Firm—Cushman, Darby & Cushman

[57] ABSTRACT

The invention relates to a process for the manufacture of solid monammonium phosphate in a suitable form for use as an ingredient in the granulation of NPK compound fertilizers. It has been found that some wet-process phosphoric acids used in the manufacture of fertilizer grade ammonium phosphate contain impurities in amounts and/or ratios which can give rise to hard oversize product in known methods of manufacture with the result that extra milling of the product is required. The process of the invention overcomes the need for extra milling by providing an improved product form. The improvement is achieved by mixing separately at one stage in a process of the kind described between 15% and 85% by volume of the total secondary acid feed with the aqueous ammonium phosphate slurry and adding the remainder of the secondary acid to the treated slurry at a later stage.

8 Claims, 1 Drawing Figure

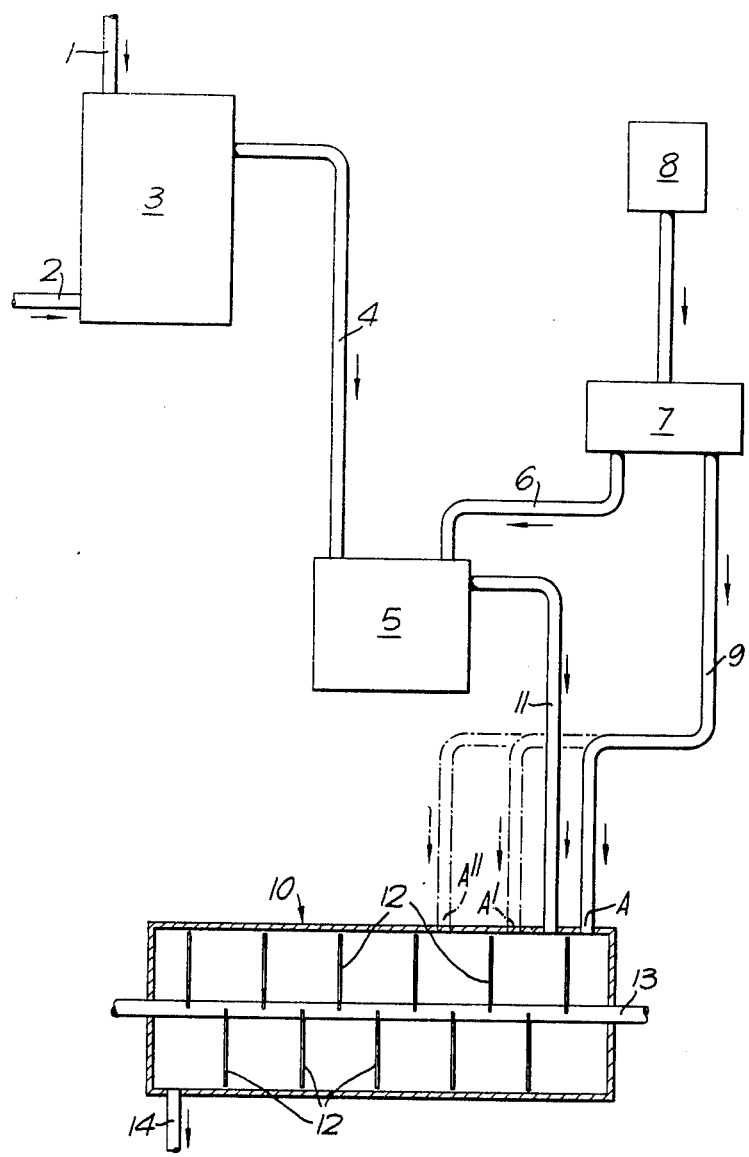

MANUFACTURE OF SOLID AMMONIUM PHOSPHATE

The present invention relates to a process for the production of solid ammonium phosphate, particularly monammonium phosphate.

Ammonium phosphate such as monammonium phosphate, $NH_4H_2PO_4$, (hereinafter referred to as MAP) and diammonium phosphate, $(NH_4)_2HPO_4$, (hereinafter referred to as DAP), and mixtures of these salts, are desirable ingredients of fertilisers because they supply both nitrogen and phosphorus, two elements which are essential to plant growth. It is well known that fertiliser grade ammonium phosphate may be made by a process which comprises treating wet-process phosphoric acid with ammonia. An ammonium phosphate is characterised by the atomic ratio of nitrogen to phosphorus which it contains, commonly termed the N:P atomic ratio; thus monammonium phosphate has an N:P atomic ratio of 1.0 and an equimolar mixture of monammonium phosphate and diammonium phosphate has an N:P atomic ratio of 1.5. In a composition containing other nitrogen or phosphorus compounds in addition to ammonium phosphate the N:P atomic ratio refers only to the ratio in the ammonium phosphate.

A process for the production of a particulate solid product comprising ammonium phosphate of N:P atomic ratio between 0.95 and 1.10 is already known, wherein a primary acid feed comprising wet process phosphoric acid is added, together with ammonia, to an aqueous slurry of ammonium phosphate which is of flowable consistency at the temperature of working and which has an N:P atomic ratio between 1.3 and 1.5, to form more slurry of substantially the same composition, concentration and flowable consistency, removing an amount of said slurry substantially equivalent to that produced by the addition of the phosphoric acid and ammonia, thereafter mixing the removed slurry with a secondary acid feed (e.g. wet-process phosphoric acid) to reduce the N:P atomic ratio to 0.95 to 1.10, and disengaging moisture from the mixture, the water contents of the removed aqueous slurry and of the secondary acid feed being such that the mixture solidifies during the moisture disengagement treatment to which it is subjected for a period of time sufficient to produce a product which is solid at ambient temperature.

Hereinafter the above described process is referred to as "a process of the kind described". One example of this process is described in our British Pat. No. 951,476.

The particulate solid product comprising ammonium phosphate made by the process of our British Pat. No. 951,476 is in the most suitable form for use as an ingredient in the granulation of mixed NPK fertilisers when the constituent particles are less than 3.5 mm in diameter (generally at least 90% product passing a 3.5 mm standard wire mesh screen). To achieve this size range, it is sometimes necessary to screen the product and mill any oversize particles.

It has been found that the proportion of product which is oversize, that is, greater than 3.5 mm, is related to the impurities in the wetprocess phosphoric acid used in the manufacture of the solid ammonium phosphate product. Important impurities include iron, aluminium, magnesium, and fluorine. The effects of these elements are interrelated and a small change in the proportion and amount of only one of them can affect how much of the product is oversize.

It has been found by using the process of British Pat. No. 951,476 that some wet-process acids containing certain proportions of the abovementioned impurities give a powdery product which requires little or no milling to obtain a product of the desired size range. Examination of this type of product has revealed that the powder comprises individual crystals or loose aggregates of crystals and that the size of these crystals is in the range 30–200 microns. However, other wet-process acids containing impurities in different amounts and/or ratios, for example wet-process acids made from some grades of phosphate rock such as those from Morocco and Tunisia can yield a product consisting of crystals of smaller size than the above indicated range of 30–200 microns. Such small crystals usually form firm aggregates of oversize material with the result that extra milling of the product may be required. This extra milling is undesirable because of the extra energy consumption involved in carrying out the milling.

We have now discovered, as described hereinafter, how to produce from wet-produce phosphoric acid of any origin an ammonium phosphate product containing a predominant amount of crystals of MAP in the abovementioned size range 30–200 um and with a reduction in the number of crystal aggregates which are oversize, that is, greater than 3.5 mm, so as to impart a powdery fluffy appearance to the solid without the need for extra milling.

We have not discovered that in a process of the kind described, MAP crystal growth is improved if the aqueous ammonium phosphate slurry of N:P atomic ratio between 1.3 and 1.5 formed by the ammoniation of wet-process phosphoric acid, is first mixed with only a part of the secondary acid feed prior to its introduction into the moisture disengagement unit. The mixing of the aqueous ammonium phosphate slurry and part of the secondary acid feed results in more controlled precipitation of some MAP and thus the formation of nuclei for further crystal growth. The improvement is obtained by mixing between 15% and 85% by volume of the secondary acid feed with the aqueous ammonium phosphate slurry to precipitate some MAP. The remainder of the secondary acid feed is then added to the treated slurry at a later stage in the process.

In accordance with the present invention we provide a process of the kind described for the production of a particulate solid product comprising ammonium phosphate of N:P atomic ratio 0.95 to 1.10 wherein the removed slurry is first mixed separately with between 15% to 85% by volume of the secondary acid feed, and the remainder of the secondary acid feed is added at a later stage in the process.

Below an N:P atomic ratio of 0.95 ammonium phosphate becomes decidedly acid, corrosive and hygroscopic, owing to the presence of free phosphoric acid, and since the invention is concerned primarily with the production of solid MAP, the upper limit of the N:P atomic ratio is fixed at 1.10. The production of an aqueous slurry of ammonium phosphate of N:P atomic ratio greater than about 1.6 usually results in loss of ammonia, and for an aqueous slurry of ammonium phosphate of N:P atomic ratio below about 1.2 the temperature rise and other effects of admixture with the secondary acid feed are generally insufficient to promote the evaporation and crystallisation necessary for the production of the desired solid product at ambient temperatures. It is to be remembered that ammonium phosphate has its maximum solubility in an aqueous ammonium phosphate slurry at an N:P atomic ratio of about 1.4 and this ratio is associated with a pH of about 6.5.

By the term "solid" is meant an intimate mixture of solid particles and saturated aqueous solution of soluble ingredients, wherein the proportion of solution is less than that at which more than a trace of liquid may separate from the product under a gauge pressure of 0.42 kg/cm$^2$, which approximates to usual storage conditions. The maximum levels of moisture content may vary with crystal size and impurity content of the ammonium phosphate, being lower with larger crystals. An MAP on N:P atomic ratio 0.95 made from a 33% $P_2O_5$ grade of Khouribga phosphate rock and of crystal size predominantly within the range 30–200 um would have a maximum moisture content of 16% under a gauge pressure of 0.42 kg/cm$^2$ and still remain within the foregoing definition of "solid".

It is to be understood that the moisture introduced into the process of the invention should not be so high as to prevent the end-product being solid at ambient temperature.

Preferably the ammonia added is either in the gaseous or substantially anhydrous liquid form but ammonia solutions are also suitable, so long as the water introduced thereby does not cause the product moisture content to exceed the value above which the product ceases to be solid at ambient temperature.

As hereinbefore described, the aqueous ammonium phosphate slurry is formed by the ammoniation of wet-process phosphoric acid, which is the primary acid feed. The secondary acid feed is the acid which is used to lower the N:P atomic ratio of the slurry. The secondary acid feed comprises a mineral acid, for example wet-process phosphoric acid, sulphuric acid, either alone or mixed with one another. This acid (or mixture of acids) may itself be partially ammoniated. The use of such partially-ammoniated acid(s) is particularly suitable in the process of the present invention for the production of product which is solid at ambient temperature and which has an N:$P_2O_5$ weight ratio of, for example, 1:2, 1:1 or 2:1. By the N:$P_2O_5$ weight ratio of a product is meant the ratio of the total weights of N and $P_2O_5$ contained in the product in any chemical form.

A proportion of the solid end-product of the process of the present invention may be recycled, before, during or after the mixing of the secondary acid with the aqueous ammonium phosphate slurry in order to assist in the rapid evolution of moisture by altering the consistency of the mixture of acid and slurry to allow greater exposure of surface of the mixture in the apparatus used for moisture disengagement.

In accordance with one embodiment of the invention, a solid ammonium phosphate of N:P atomic ratio in the range 0.95 to 1.10 is produced by mixing wet-process phosphoric acid of $P_2O_5$ content in the range of 30% to 54% $P_2O_5$ and gaseous ammonia to form an aqueous slurry of ammonium phosphate, the N:P atomic ratio of the slurry being fixed in the range 1.3 to 1.5 and the moisture content of the slurry being fixed in the range 10% to 20%, in such proportions as to form more slurry of substantially the same composition, i.e substantially fixed N:P atomic ratio and substantially fixed moisture content, simultaneously removing from the slurry an amount substantially equivalent to that produced from the phosphoric acid and ammonia, and mixing the removed amount of slurry separately with 15% to 85% by volume, preferably 20% to 80% of the total amount of a secondary wet-process phosphoric acid feed required to reduce the N:P atomic ratio of the slurry to between 0.95 and 1.10, followed by the addition of the remainder of the said secondary acid at a further stage in the process, such that the product so formed solidifies, mainly by evaporative cooling, in a moisture disengagement unit and is of the desired N:P atomic ratio and under such conditions that the moisture content of the product is so reduced by evaporation (caused, for example, by the heat of reaction and heat of crystallisation and by the use of sensible heat), that the product is solid as hereinbefore defined at ambient temperature.

The process of the present invention is illustrated in the accompanying drawing with reference to the following Examples in which the slurry stream is mixed with part of the secondary acid feed so that nuclei of MAP are produced to provide growth points for subsequent crystallisation and thus encourage further crystal growth.

EXAMPLE 1

A solid product, solid as hereinbefore defined, of ammonium phosphate of average composition 10.9% N, 48.0% $P_2O_5$ (total), 7.6% $H_2O$ and N:P atomic ratio 1.00 is made at a rate of 516 kg per hour by the addition of 442 kg per hour of 40% wet-process phosphoric acid (1) at 20° C (made from 33% $P_2O_5$ Khouribga phosphate rock) and 66 kg per hour of gaseous ammonia (2) to a reaction vessel (3) containing a slurry of composition 44% $P_2O_5$, 14% $H_2O$ and N:P atomic ratio 1.4 at a temperature in the range 120° to 130° C (for example 120°–125° C). The hot slurry, substantially equivalent to that produced in the reaction vessel is introduced via (4) into a slurry/acid mixing unit (5) with a hold-up time of about 10 minutes. 60% of the volume of the total secondary acid feed requirement of 147 kg per hour of 48% $P_2O_5$ wet-process phosphoric acid is introduced via (6) from a secondary acid feed splitter box (7) which is a device for dividing the secondary acid feed from a secondary acid tank (8) into two or more streams (6) and (9) and may, for example, comprise a vessel containing two or more separate sections (not shown) comprising for example, compartments, channels, weirs, or the like, each with an outlet which may be opened or closed in order that the secondary acid feed may be divided into desired proportions. The secondary acid feed (6) is pre-mixed with the aqueous ammonium phosphate slurry in the slurry/acid mixing unit (5) which is preferably steam heated and mounted near one end of a twin shafted U-trough pin mixer (10) which acts as a moisture-disengagement unit. The mixing unit (5) for mixing part of the secondary acid feed (6) with the aqueous ammonium phosphate slurry stream (4) may, for example, comprise a tank or a number of tanks in series each with means (not shown) for vigorous agitation of the slurry and the secondary acid feed, for example by means of a propellor. The treated slurry, now with the N:P atomic ratio reduced to 1.16 as a result of the initial acid treatment in unit (5), flows via (11) to one end of the pin mixer (10) and the remaining 40% by volume of secondary acid is added directly via (9) to the pin mixer (10) at one or more points (A, A$^1$, A$^{11}$), for example at the point A as shown in the drawing. The overall effect of this procedure is the precipitation of some MAP crystals in (5) and thus the formation of nuclei for crystal growth in the pin mixer (10) when the remainder of the secondary acid is added via (9). The product of this reaction solidifies as it passes along the mixer (10) and is repeatedly broken up and has fresh surfaces exposed by the action of blades (12) on a rotating shaft (13) which thus assists disengagement of moisture which is carried off by overhead venting (not shown) and produces a final solid product at (14), the product being at 33° C and containing 7.6% $H_2O$. All parts are parts by weight except for the divided secondary acid feed which are by volume.

The resulting MAP was examined and compared with a control sample prepared in the same way but omitting the step of mixing part of the secondary acid feed with the slurry stream; that is, all the acid and slurry were mixed at the same time. The process of the present invention had the effect of giving a more fluid slurry at N:P atomic ratio 1.0 and a greater proportion of large crystals. In addition, the product obtained by the process described in this Example was a mixture of finely-divided, fluffy material and very soft, granules, which required no milling while the control sample gave a proportion of oversize product which required milling to reduce the particle size to less than 3.5 mm in diameter.

EXAMPLE 2

A solid product, solid as hereinbefore defined, of ammonium phosphate of average composition 11.8% N, 46.6% $P_2O_5$ (total), 5.5% $H_2O$ and N:P atomic ratio 0.98 was made at a rate of 11.4 tonnes/hour by the addition of 9.77 tonnes/hour 39% $P_2O_5$ wet-process phosphoric acid (1), made from 33% $P_2O_5$ Khouribga phosphate rock, and 1.63 tonnes/hour of gaseous ammonia (2) to a reaction vessel (3) containing a preformed slurry of N:P atomic ratio 1.4 and at a temperature of 125° C. The hot slurry, substantially equivalent to that produced in the reaction vessel, is introduced via (4) into a steam-heated slurry/acid mixing unit (5) as in Example 1. 40% by volume of the total secondary acid feed requirement of 3.16 tonnes/hour 48% $P_2O_5$ wet-process phosphoric acid is introduced via (6) from a secondary acid feed splitter box (7) and is pre-mixed with the aqueous ammonium phosphate slurry in the steam-heated slurry/acid mixing unit (5) near one end of the pin mixer (10). The treated slurry then flows via (11) to the pin mixer (10). The remaining 60% by volume of secondary acid is added via (9) to the pin mixer at point A as shown in the drawing.

The resulting MAP was examined and compared with a control sample prepared in the same way but omitting the step of mixing part of the secondary acid feed with the slurry stream. The process of the present invention had the effect of giving a more fluid slurry at N:P atomic ratio 1.0 and a greater proportion of large crystals. In addition, the product obtained by the process described in this Example was a mixture of finely-divided fluffy material and very soft granules which required no milling, while the control sample gave a proportion of hard, gritty oversize product which required milling to reduce the particle size to less than 3.5 mm in diameter.

EXAMPLE 3

313 kg/hour of a wet-process phosphoric acid (1) containing 40% $P_2O_5$ made from 30 % $P_2O_5$ Gafsa phosphate rock was treated with 36 kg/hour gaseous ammonia (2) in a separate reaction vessel (3) to form a slurry of N:P atomic ratio 1.4 at a temperature of about 120°–130° C (e.g. about 126° C) and a moisture content of 15% $H_2O$ by weight. The hot slurry, substantially equivalent to that produced in the reaction vessel (3) was introduced via (4) into a steam-heated slurry/acid mixing unit (5). 80% by volume of the total secondary acid feed requirement of 86 kg/hour of wet-process phosphoric acid containing 51% $P_2O_5$ from the same phosphate rock source was introduced via (6) to lower the N:P atomic ratio of the slurry, the latter step being carried out in the steam-heated slurry/acid mixing unit (5) which is mounted near one end of a pin mixer (10) which acts as a moisture-disengagement unit. The remaining 20% by volume of secondary acid was added direct via (9) to the pin mixer (10) at one or more points (A, $A^1$, $A^{11}$), for example at point A as shown in the drawing. The moisture disengaging unit, that is, the pin mixer (10), allowed moisture to be released from the product as it passed along the pin mixer. The production rate of MAP during the run was 319 kg/hour and the final product had an N:P atomic ratio of 1.05 and an average composition 10.4% N, 53.0% $P_2O_5$ (total), 7.86% $H_2O$.

The resulting MAP was examined and compared with a control sample prepared in the same way but omitting the step of mixing part of the secondary acid feed with the slurry stream; that is, all the acid and slurry were mixed at the same time. The process of the present invention had the effect of giving a more fluid slurry at N:P atomic ratio 1.0 and a greater proportion of large crystals. In addition, the product obtained by the process described in this Example was a mixture of finely-divided, fluffy material and very soft granules which required no milling, while the control sample gave a proportion of hard, gritty oversize product which required milling to reduce the particle size to less than 3.5 mm in diameter.

What we claim is:

1. A process for the production of a particulate solid product comprising ammonium phosphate of N:P atomic ratio 0.95 to 1.10 wherein a primary phosphoric acid-containing feed and ammonia are added to an aqueous slurry of ammonium phosphate of flowable consistency at the temperature of working and having an N:P atomic ratio of between 1.3 and 1.5 to form more slurry of substantially the same composition and concentration and flowable consistency, removing an amount of said slurry substantially equivalent to that produced by the addition of the phosphoric acid and ammonia and thereafter mixing the removed slurry with a secondary acid feed to reduce the N:P ratio to 0.95 to 1.10, wherein the removed slurry is first mixed separately with between 15% and 85% by volume of the secondary acid feed, followed by the addition of the remainder of the secondary acid at a later stage, so that the ammonium phosphate of the resulting product has an N:P atomic ratio in the range 0.95 to 1.10, the water contents of the removed aqueous slurry and the secondary acid feed being such that the resulting product solidifies in a moisture disengagement unit where it is treated for a sufficient period of time for said product to be solid at ambient temperature.

2. A process as claimed in claim 1, wherein the remainder of the secondary acid feed is fed directly to the moisture disengagement unit.

3. A process as claimed in claim 1, wherein the remainder of the secondary acid feed is mixed with the removed slurry/secondary acid feed mixture, and fed together therewith to the moisture disengagement unit.

4. A process as claimed in claim 1, wherein the secondary acid feed is a mineral acid selected from the group consisting of phosphoric acid, sulphuric acid and mixtures thereof.

5. A process as claimed in claim 4, wherein the phosphoric acid is wet-process phosphoric acid.

6. A process as claimed in claim 1, wherein the secondary acid feed is partially ammoniated.

7. A process as claimed in claim 1, wherein a part of the solid end-product is recycled to the process.

8. A process for producing a particulate solid product comprising ammonium phosphate of N:P atomic ratio in the range 0.95 to 1.10 is performed by mixing "wet-process" phosphoric acid of $P_2O_5$ content in the range 30% to 54% $P_2O_5$ and gaseous ammonia to form an aqueous slurry of ammonium phosphate, the N:P atomic ratio of the slurry being fixed in the range 1.3 to 1.5 and the moisture content of the slurry being fixed in the range 10% to 20%, in such proportions as to form more slurry of substantially the same composition, simultaneously removing from the slurry an amount substantially equivalent to that produced from the phosphoric acid and ammonia, and mixing the removed amount of slurry with between 15% and 85% by volume of further "wet-process" phosphoric acid, thereafter adding the remainder of the "wet-process" phosphoric acid, whereby the product so formed solidifies and is of the desired N:P atomic ratio, the moisture disengagement being carried out under such conditions that the moisture content of the product is so reduced by evaporation that the product is solid at ambient temperature.

* * * * *